United States Patent
Nomoto

(10) Patent No.: US 7,190,475 B2
(45) Date of Patent: Mar. 13, 2007

(54) METHOD FOR PROVIDING A PRINT AND APPARATUS

(75) Inventor: Tetsushi Nomoto, Yokohama (JP)

(73) Assignee: Nikon Corporation, Tokyo (JP)

( * ) Notice: Subject to any disclaimer, the term of this patent is extended or adjusted under 35 U.S.C. 154(b) by 992 days.

(21) Appl. No.: 09/802,846

(22) Filed: Mar. 12, 2001

(65) Prior Publication Data

US 2002/0051177 A1    May 2, 2002

(30) Foreign Application Priority Data

Mar. 16, 2000 (JP) ............................. 2000-073424
Mar. 28, 2000 (JP) ............................. 2000-088337

(51) Int. Cl.
*G06K 15/00* (2006.01)
*G06K 1/00* (2006.01)

(52) U.S. Cl. .................... 358/1.15; 358/1.13; 358/1.14; 382/115; 705/1; 715/838; 713/150; 713/152; 713/153

(58) Field of Classification Search ............... 358/1.15, 358/403, 1.13, 1.14; 705/26, 27, 1; 355/49, 355/40; 396/639, 429, 311; 709/217; 707/202; 715/838; 382/115
See application file for complete search history.

(56) References Cited

U.S. PATENT DOCUMENTS

| | | | |
|---|---|---|---|
| 6,017,157 A * | 1/2000 | Garfinkle et al. ........... 396/639 |
| 6,324,521 B1 * | 11/2001 | Shiota et al. ................. 705/27 |
| 6,516,157 B1 * | 2/2003 | Maruta et al. ................. 399/8 |
| 6,578,072 B2 * | 6/2003 | Watanabe et al. ........... 709/217 |
| 6,583,799 B1 * | 6/2003 | Manolis et al. ............. 715/838 |
| 6,636,837 B1 * | 10/2003 | Nardozzi et al. ............. 705/27 |
| 6,646,754 B1 * | 11/2003 | Redd et al. ................. 358/1.13 |
| 6,657,702 B1 * | 12/2003 | Chui et al. ..................... 355/40 |
| 6,665,083 B1 * | 12/2003 | Nakajima et al. .......... 358/1.15 |
| 6,707,531 B2 * | 3/2004 | Crasnianski et al. .......... 355/49 |
| 6,714,314 B1 * | 3/2004 | Ueda ......................... 358/1.15 |

(Continued)

FOREIGN PATENT DOCUMENTS

EP    0 896 334 A2    2/1999

(Continued)

*Primary Examiner*—Kimberly Williams
*Assistant Examiner*—Satwant Singh
(74) *Attorney, Agent, or Firm*—Oliff & Berridge, PLC

(57) ABSTRACT

The object of the present invention is to provide a method for providing a print which is designated by a viewer, and whose print charge is paid by a registrant. Another object of the present invention is to provide a method for providing a print. The method makes it possible for a digital contents purchaser to easily obtain a label or jacket suitable to the digital contents. Moreover, another object of the present invention is to provide an apparatus for each method described above. According to one aspect of the present invention, a method for providing a print of a digital image registered by a registrant in response to an order from a viewer comprises steps described below. A first step is a step of receiving the digital image from the registrant. A second step is a step of registering the received digital image. A third step is a step of showing the registered digital image to a viewer. A fourth step is a step of accepting the order for the print of the digital image from the viewer. A fifth step is a step of producing the ordered print of the digital image. A sixth step is a step of billing the print charge to the registrant.

36 Claims, 15 Drawing Sheets

U.S. PATENT DOCUMENTS

| | | | |
|---|---|---|---|
| 6,714,736 B2 * | 3/2004 | Manico et al. | 396/311 |
| 6,762,860 B1 * | 7/2004 | Watanabe et al. | 358/403 |
| 6,819,783 B2 * | 11/2004 | Goldberg et al. | 382/115 |
| 6,937,989 B2 * | 8/2005 | McIntyre et al. | 705/1 |
| 2001/0019422 A1 * | 9/2001 | Hara | 358/1.15 |
| 2001/0036366 A1 * | 11/2001 | Cook et al. | 396/429 |
| 2004/0015407 A1 * | 1/2004 | Sales et al. | 705/26 |

FOREIGN PATENT DOCUMENTS

EP    0 930 774 A3    8/2000

\* cited by examiner

SET PASSWORD

ALBUM NAME;

PASSWORD;

PRINT CHAGE PAYER; | VIEWER | IMAGE REGISTRANT

TRANSMIT

FIG. 4

SET ORDER LIMIT

|  | THE NUMBER OF ORDERED TIMES | THE NUMBER OF PRINTS | THE AMOUNT OF PRINT CHARGE |
|---|---|---|---|
| ALL VIEWERS |  |  |  |
| ONE VIEWER |  |  |  |

| TIME LIMIT OF ORDER | MONTH/DATE/YEAR |

TRANSMIT

FIG. 5

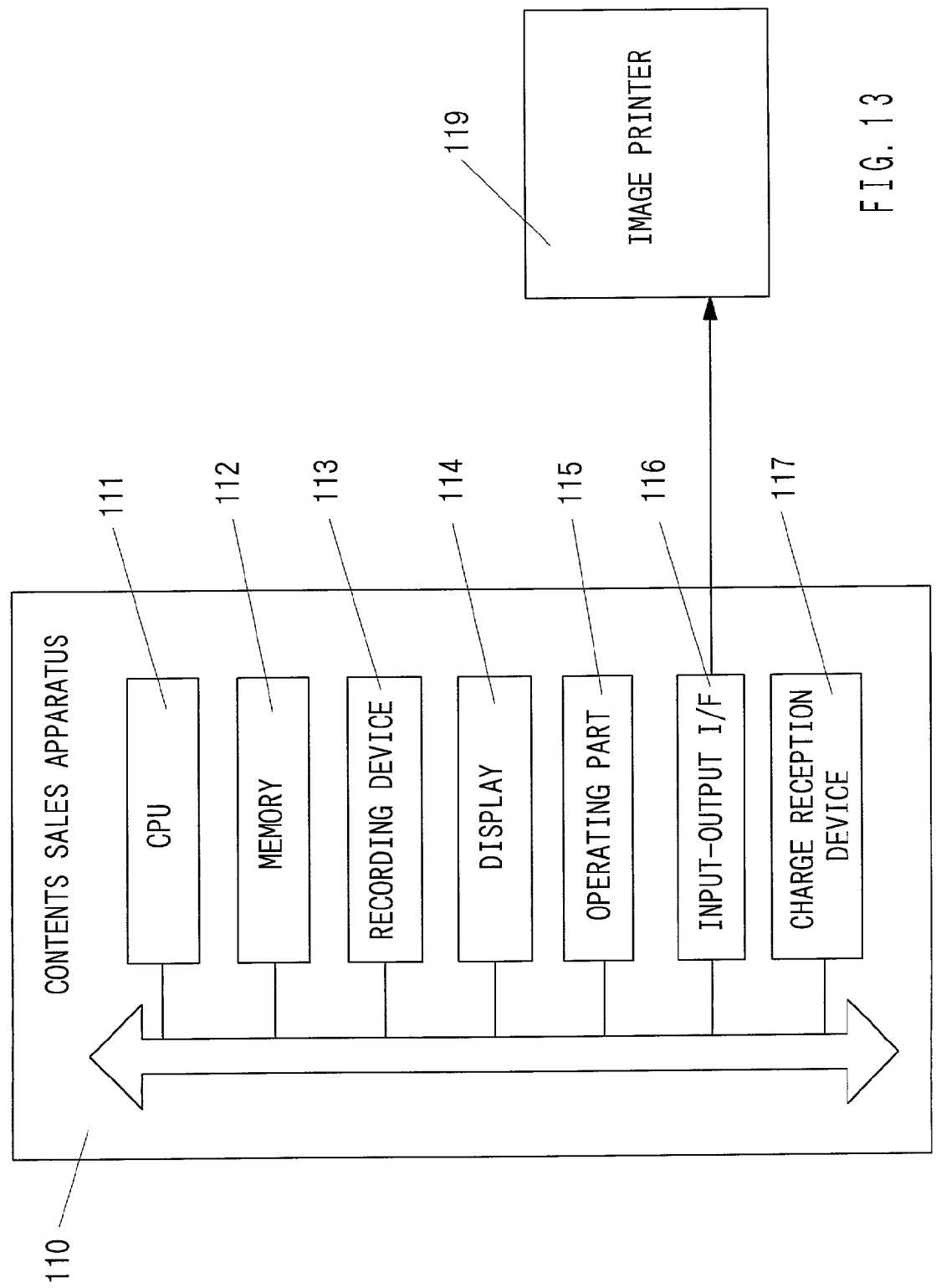

METHOD FOR PROVIDING A PRINT AND APPARATUS

BACKGROUND OF THE INVENTION

1. Field of the Invention

The present invention relates to a method for providing a print of an image and an apparatus thereof, and, in particular, to a method for providing a print of an image from a remote place and an apparatus thereof.

2. Description of Related Art

With increasing popularity of digital cameras, a digital print of a photographed image has become popular. In a form of the image printing business, there are those that can be realized only because the image information is the digital image data.

For example, the following image printing business has been carried on: a digital print provider, a provider of the Internet, or the like makes users register digital images together with a password set arbitrarily by the user, keeps them in a server computer as well as opens to viewers who access to the server computer by inputting the password via a communication means such as the Internet, and receives an order for forming a digital print from the viewer.

Regarding the image printing business, there is a merit that the viewer can select desired images from the registered images, and order for digital prints. It is convenient for these cases that a plurality of prints for a group photo are to be distributed to each attendant, and that somebody wants a latest photo to be sent to an acquaintance living in a remote place.

By the way, it is often happen that the cost for distributing the print of a group photo of a plurality of people is paid as an item of the party expenditure. Regarding specially invited attendant such as, for example, attendants to a wedding party, a teacher of an alumni meeting, it is common that the host of a party pays the cost of the print. When a latest photo is sent to an acquaintance or a relative living in a remote place, it is inappropriate to let them pay the print cost. In the case of conventional silver halide photograph, since a print presenter such as the host of the meeting pays the cost of the print, and delivers the print to the presentee, it has been no problem described above. However, it has been difficult to let the presentee choose desired images.

Regarding the digital data such as music, game soft, and digital AV, not the media on which the digital data is recorded, but the digital contents that is only contents of the data has started to be sold. Specifically, a contents purchaser sets a recording medium prepared by the contents purchaser in a contents selling apparatus arranged in front of a store, selects a contents to be purchased by a predetermined operation, and copies the data of the selected contents on the medium. Alternatively, the contents purchaser accesses to a contents sales site of a contents seller from the contents purchaser's PC via the Internet, downloads the data of the contents to be purchased by carrying out the predetermined operation indicated by the site, and copies onto a recording medium set in the PC. The operation to pay the purchasing cost is included in the predetermined operation. Thus, the contents purchaser can obtain the recording medium on which the digital contents are recorded. In this method however, there are no label or jacket for indicating the contents unlike the case that the contents seller purchases the recording medium on which the data of the contents is recorded. This is inappropriate when the contents purchaser arranges and keeps the recording medium on which the contents is recorded. Although the contents purchaser can make the title and jacket by own handwriting or by the PC, it is often difficult to produce those that suit the contents. Accordingly, the contents purchaser has been hardly satisfied with those handmade label or jacket.

SUMMARY OF THE INVENTION

The present invention is made in view of the aforementioned problems and has an object to provide a method for providing a print and the method that a viewer designates an image to be formed a print, and the print charge is billed to a digital image registrant.

Another object of the present invention is to provide a method for providing a print. The method makes it possible for a digital contents purchaser to easily obtain a label or jacket suitable to the digital contents.

Moreover, another object of the present invention is to provide an apparatus for each method described above.

According to one aspect of the present invention, a method for receiving an order for a print includes steps described below. A first step is a step that receives a digital image from the registrant. A second step is a step that registers the received digital image. A third step is a step that shows the registered digital image to a viewer. A fourth step is a step that accepts the order for the print of the digital image from the viewer. A fifth step is a step that produces the ordered print of the digital image. A sixth step is a step that bills the print charge to the registrant. Accordingly, the print order of an image selected by the viewer from digital images registered by the registrant is received and the print charge is billed to the registrant, so that the viewer can obtain a print of any image without paying the print charge.

In one preferred embodiment of the present invention, the method further includes a step of receiving a digital image with a discrimination denoting that the print charge of the digital image is to be paid by the registrant, a step of registering the digital image with the discrimination together with the discrimination, and a step of billing the print charge of the print of the digital image with the discrimination to the registrant.

Moreover, the method further includes a step of permitting only a viewer with a predetermined identification to view the image with the discrimination, and a step of allowing only a viewer with a predetermined identification to order the print of the digital image with the discrimination.

Therefore, the method makes it possible that the images whose print charge is paid by the registrant and those paid by the viewer are intermixed.

In one preferred embodiment of the present invention, the first step is carried out through a computer communication with the registrant, and the third and the fourth step are carried out through a computer communication with viewer. Accordingly, the method makes it possible to register a digital image, view the digital image, and place a print order of the image from a remote place.

In one preferred embodiment of the present invention, the method further includes a step for setting an limit to the order from the viewer, so that the method eliminates the risk of producing an unexpected print charge to the registrant.

In one preferred embodiment of the present invention, the method further includes a step of making it possible to accept the print order whose print charge is paid by the viewer, a step of adding the number of prints of the digital image on the viewer's account to that of the same digital print on the register's account, and the sum of the number of the prints are produced at a time.

Accordingly, the method forms the print in bulk based on the amount of the summation of the number of the order whose print charge is paid by the registrant and that paid by the viewer, so that the print can be formed effectively.

In one preferred embodiment of the present invention, the method further comprises a step of accepting an order for purchasing a product of digital contents relating to the digital image and a step of selling the product by copying the digital contents on a recording medium of the viewer.

Accordingly, the method makes it possible to provide a print of the image relating to the digital contents purchased by a viewer to the viewer.

According to another aspect of the present invention, a method for providing a print of a digital image registered by a registrant in response to orders from a plurality of viewers includes the steps described below. A first step is a step that receives a digital image from the registrant. A second step is a step that registers the received digital image. A third step is a step that shows the registered digital image to the viewers. A fourth step is a step that accepts the orders for the print of the digital image from the viewers. A fifth step is a step that sums up the orders accepted within the period. A sixth step is a step that produces the prints based on the fifth step.

Accordingly, the method makes it possible to produce the print accepted order within the period in bulk, so that the print can be formed effectively.

In one preferred embodiment of the present invention, the fourth to the sixth step are repeated with a short period, so that the print can be delivered to the viewer within a short time from accepting the print order even if the time period of accepting a print order extends over a long time period.

In one preferred embodiment of the present invention, the method further includes a step of billing the print charge based on the summed up number of the accepted order to the registrant.

Accordingly, the viewer can obtain a digital print without paying the print charge.

According to another aspect of the present invention, a method for providing a purchaser of the product of digital contents with a print of an image registered by a registrant relating to the product of digital contents includes steps described below. A first step is a step of having a registrant sell the product of digital contents to the purchaser. A second step is a step of having a printer receive information relating to the registered image from the registrant. A third step is a step of having the printer produce the print of the image for the purchaser based on the information. A fourth step is a step of having the printer bill the print charge to the registrant.

Accordingly, the method makes it possible that the registrant provides a print of an image relating to the digital contents to the purchaser.

In one preferred embodiment of the present invention, the information is received by the printer through a computer communication with the registrant.

In one preferred embodiment of the present invention, an identification is issued for the purchaser by the registrant and received from the purchaser by the printer.

Accordingly, the sales of the digital contents and the provision of a print are separated.

In one preferred embodiment of the present invention, the method further includes a step of registrant issuing a password to the purchaser and third step is only effective when the password is input to the printer.

In one preferred embodiment of the present invention, the method further includes a step of making the purchaser select any image from a plurality of images relating to the digital contents. It is convenient for the purchaser.

In one preferred embodiment of the present invention, the information includes an image data of a digital image, or information that specifies the image. Moreover, the specified image is an image recorded on a film or a digital image. Furthermore, the registrant outputs the information necessary for delivering the print to the purchaser, which is input, to the printer through the computer communication.

In one preferred embodiment of the present invention, the method further includes a step of receiving information regarding a kind of the recording medium on which the digital contents purchased by the purchaser are recorded, a step of selecting a paper for the print and contents of the print other than the image based on the information regarding the kind of the recording medium, and a step of printing the contents of the print other than the image in a predetermined area of the paper.

Accordingly, the method makes it possible to provide a label and jacket suitable for the recording medium on which the digital contents are recorded together with a message to be showed to the purchaser.

BRIEF DESCRIPTION OF THE DRAWINGS

FIG. 4 is an input window for setting a password and the like.

FIG. 5 is an input window for inputting conditions to limit an order.

FIG. 13 is a block diagram showing a system for selling digital contents according to a fourth embodiment of the present invention.

DESCRIPTION OF THE PREFERRED EMBODIMENTS

First Embodiment

Figure 1:
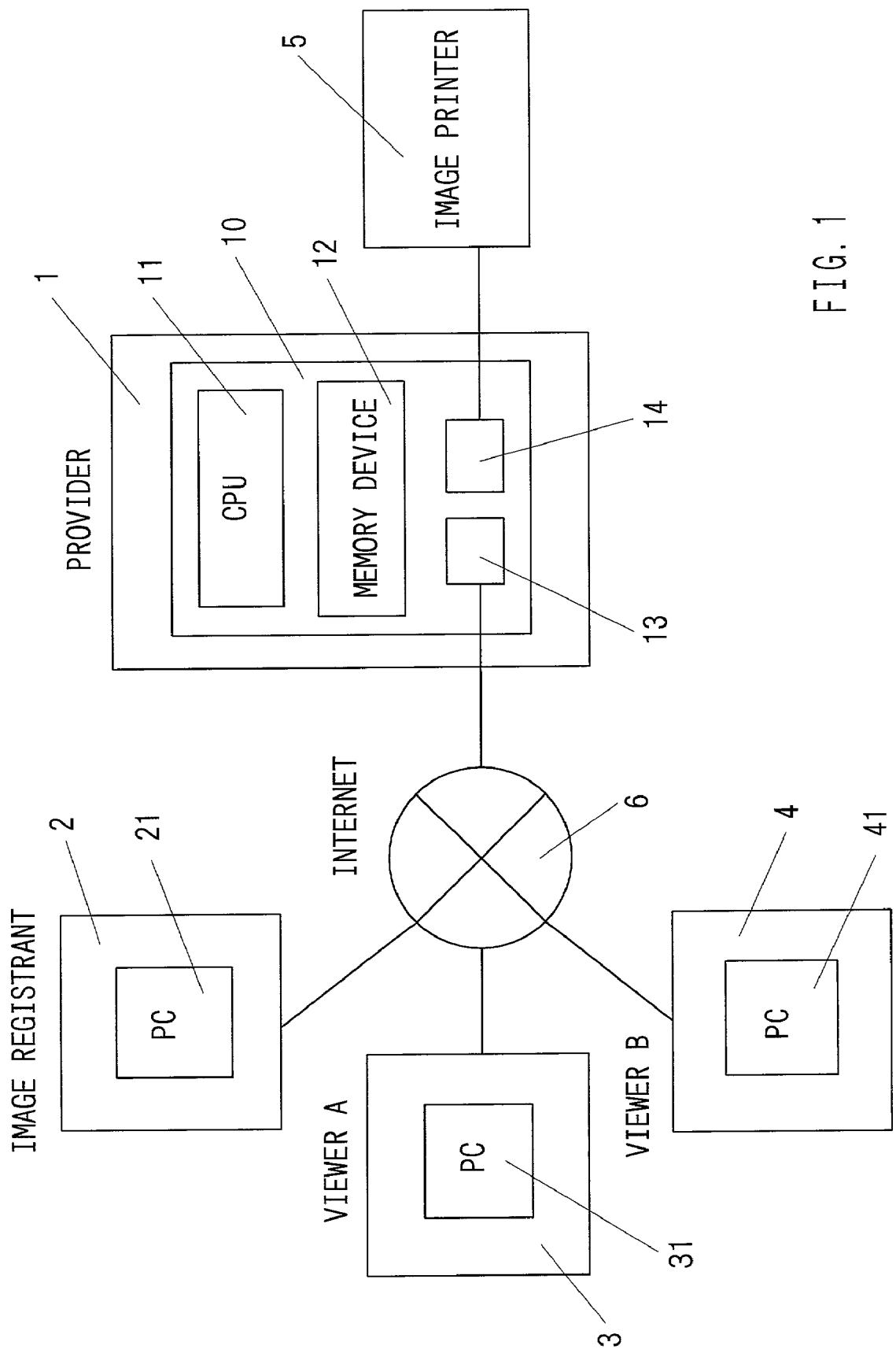
FIG. 1 is a block diagram showing a schematic construction of a system for receiving an order for digital print according to a first embodiment of the present invention.

FIG. 1 is a block diagram showing an example of a schematic construction of a system for receiving an order for a digital print according to the present invention. A provider 1 is equipped with a server computer (hereinafter called a server) 10. The server 10 has a CPU 11, a memory device 12, an Internet connecting means 13 and an output interface (output I/F) 14 each connected with a bus-line. The server 10 is connected with the Internet 6 via the Internet connecting means 13 and is able to communicate with an information apparatus such as a personal computer and the like located outside. Digital image data (image data) is stored in the memory device 12 and are output to a digital image printer (image printer) 5 via the output I/F 14. The CPU 11 controls the aforementioned components and carries out the aforementioned movements.

The image printer 5 produces a print (digital print) of the digital image based on the image data.

In the Internet 6, a personal computer (PC) 21 of an image registrant 2 who registers digital images with the server 10 of the provider 1 via the Internet is connected with a PC of a viewer who views the registered digital images via the Internet. The viewer may be plural and, here, it is shown the example that the PC 31 of the viewer A (3) and the PC 41 of the viewer B (4) are connected.

The PC 21 of the image registrant 2 memorizes digital image data such as digital image taken by a digital camera.

Figure 2:
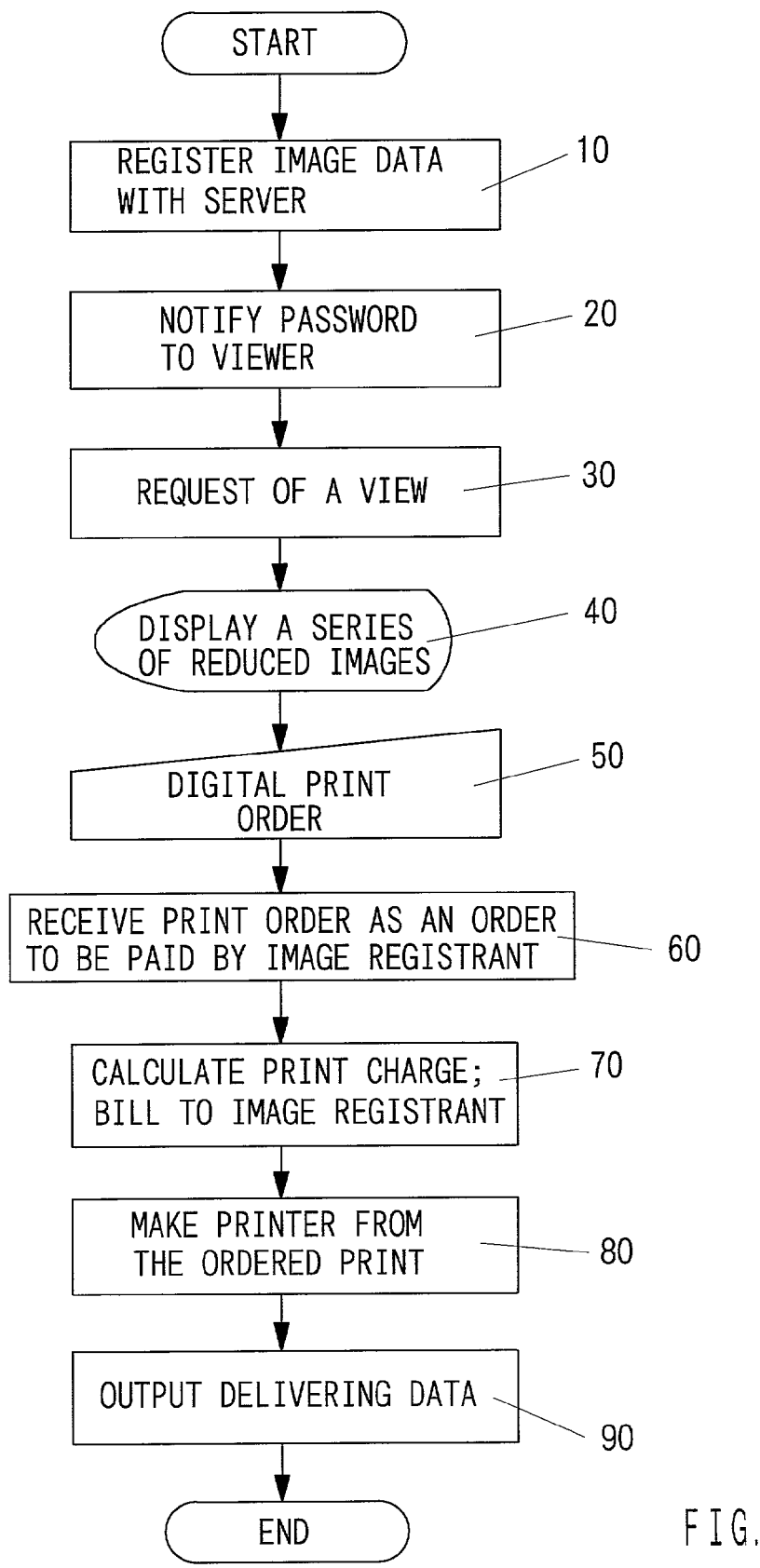
FIG. 2 is a flow chart showing a fundamental procedure of a method according to the first embodiment of the present invention.

A flow chart showing a fundamental procedure of a method for receiving an order for print image according to a first example of the present invention is shown in FIG. 2.

In step S10, the image registrant 2 registers the digital image data together with the album name and password with the server 10 of the provider 1 via a communication means such as the Internet. On that occasion, the image registrant 2 is designated as the payer who pays the print charge.

In step S20, the image registrant 2 notifies the viewers A and B of the album name and password.

In step S30, the viewer A and/or the viewer B (hereinafter called the viewer) access an image-viewing-request window of the digital print order site set up by the provider 1 via the Internet, transmit the album name and password notified by the registrant 2 to the server 10, and require the provider 1 to show the album. On that occasion, the way to receive a completed print such as a home delivery service or a service counter where the print is received is designated. Moreover, e-mail address, facsimile number, and the like are notified to the provider 1. On the other hand, when the user registration is carried out in advance, the above-mentioned information is designated on that occasion. The server 10 memorizes the way to receive and the designated contents.

In step S40, the server 10 displays a series of reduced images of the digital image correspondence with the transmitted album name and password on the viewer's PC.

In step S50, the viewer selects an image to be printed from the series of reduced images that is displayed on the viewer's PC, and places the print order to the provider 1.

In step S60, the server 10 receives the print order accepted as an order to be paid by the image registrant.

In step S70, the server 10 calculates the charge for the print that is accepted as an order to be paid by the image registrant, and bills to the payer designated in step S10, that is the image registrant.

In step S80, the server 10 transmits image data of the digital image ordered for digital print to the image printer 5, and makes the image printer 5 form a digital print of the digital image.

In step S90, the server 10 outputs a delivering data for delivering the digital print to a person who ordered the digital print. When the way to receive designated in step S30 is a home delivery service, the server 10 makes a printer print out a home delivery slip. When the way to receive is to receive on the service counter, an exchange order is transmitted to the viewer who ordered the digital print by means of e-mail or facsimile.

By the way, the image registrant 2 may be the viewer at the same time.

Then, the steps requiring the further explanation are explained.

First, the detail of step S10 is explained with reference to the flow chart of FIG. 3.

In step S11, the registrant 2 accesses to a digital image registering window of the digital print ordering site set up by the provider via the Internet.

Then, in step S12, the image data of the digital image stored in the PC 21 is transmitted to the server 10 in accordance with an instruction of the digital image registering window displayed on the PC 21. The digital image registering window consists of the following plurality of pages: a page for designating the image data file by inputting the directory and file name on the PC 21 in which the image data of the digital image to be registered is stored; and a page for showing input spaces for inputting the album name attaching to the digital image to be registered and the password permitting to view the registered digital image, and a payer selection space for designating a person who pays the charge for the digital print of the registered digital image (FIG. 4). Information for these pages is also transmitted to the server. Here, for example, the image registrant is selected as the payer by clicking a "registrant" in the payer selection space with a mouse button. By the way, when a "viewer" is clicked, the viewer is designated as the payer. This is a conventional method for receiving an order for digital print.

In step S13, the server 10 discriminates whether the registrant is the payer or not.

In step S14, when the registrant is the payer, an input window for inputting conditions to limit an order (FIG. 5) is displayed on the PC 21.

In step S15, in the print order limit setting window, the image registrant 2 inputs limiting conditions such as a cumulative amount of cost charged on the registrant's account, the cumulative number of ordering times, the cumulative number of prints and the time limit for the order, and transmits to the server 10. Only indispensable items should be input. The upper limits for the cumulative amount of cost, the cumulative number of ordering times, and the cumulative number of prints can be either the cumulative number of order from all viewers or that from each viewer, or both. In FIG. 5, the print order limit setting window where both cases can be set is shown.

The print order limit setting window is for avoiding the risk that the print order from the viewer is accepted without limitation, and all the print cost becomes a charge to the image registrant. Although it is not necessary to set print order limit when the viewer is closely connected person, the print order limit setting window that can limit the print order paid by the registrant is provided otherwise.

In step S16, the server 10 stores and registers the transmitted digital image data, the album name, password, and limiting conditions to the memory device 12 in connection with the information whether the registrant is designated to be payer or not.

In step S17, when the server 10 discriminates, in step S13, that the registrant is not the payer, the viewer is registered to be the payer as same as the conventional method for receiving an order.

By the way, the registration of the digital image may be carried out by the following procedure without using the image registering window of the provider 1: the image registrant forms the image registering file in which image data of the digital image to be registered, the album name, the password, and the information whether the registrant is designated to be payer or not are recorded in accordance with the format predetermined by the provider 1; and transmits the image registering file to the server 10. Moreover, the registration may be carried out by the procedure that the memory medium on which the registering file is recorded is sent to the provider 1, and the provider 1 makes the server 10 to read it.

When the print order limiting condition is set in step S115, it is preferable to notify the print order limiting condition to the viewer in step S20.

Then, the detail of step S40 is explained. The server 10 searches the digital images registered in the memory device 12 for the digital image having the album name and password in correspondence with the transmitted album name and password. Then, an image viewing window (FIG. 6) including a list of reduced image of the searched digital image is displayed on the viewer's PC. Moreover, when one of the reduced images is clicked by the mouse, original image (enlarged image) of the reduced image is displayed for confirming the image quality and detail of the digital image and for appreciating the image.

Figure 6:
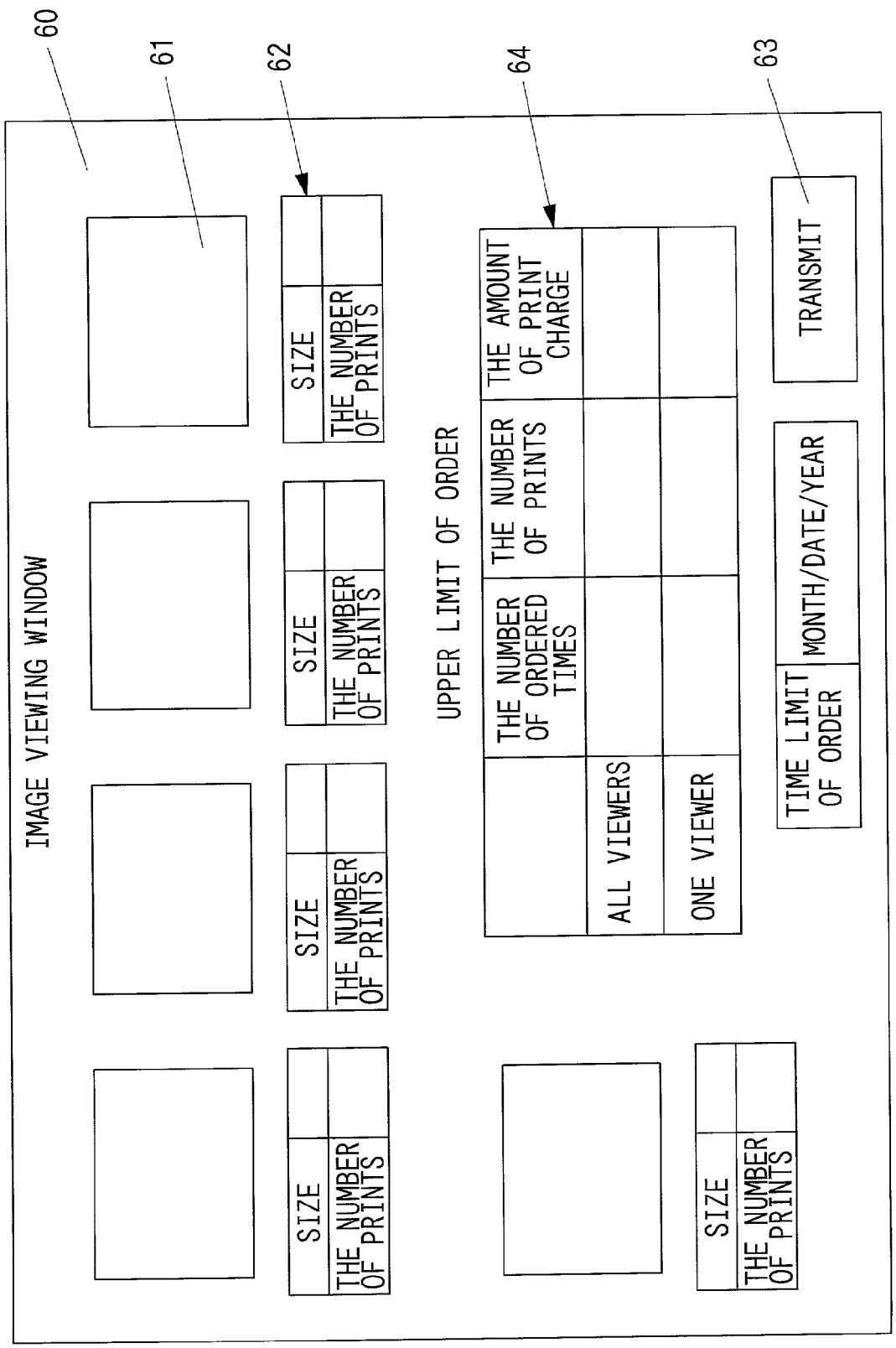
FIG. 6 is an input window for ordering a digital print.

Then, the detail of step S50 is explained. In FIG. 6, a print order instructing space 62 for instructing a digital print order of the correspondent digital image is attached in the vicinity of the reduced image 61 displayed in the image viewing window 60. The requested size and number of print is written in the print order instructing space 62 of the digital image to be ordered to print. Then, the order is carried out by clicking the transmitting button 63 in the image viewing window 60 by the mouse. By the way, the space denoted by 64 is an example of the print order limit setting window explained in step S15.

Then, the detail of step S60 is explained. When the server 10 receives a print order charged on the image registrant's account, the amount of this order is added to the cumulative amount of order charged on the registrant's account and the cumulative amount of order is renewed. Then, the renewed cumulative amount of order is compared with the upper limit set in step S15. Whether the received date is before the time limit or not is discriminated. This processing is carried out about all items having an upper limit. The order is accepted as an order charged on the registrant's account only when the limiting items are all within the limit.

When even one item exceeds the upper limit, the order is not accepted as an order charged on the registrant's account, and it is displayed on the viewer's PC. The display will be explained later in detail.

Then, the detail of step S70 is explained. The server 10 calculates a charge for the print based on the received order regarding the print size and the number of print. Then, the server bills the credit card company for the calculated print charge based on the credit card information informed by the image registrant 2 in advance, transmits the image data of the digital image received the order to the image printer 5, and makes it form the digital print.

Alternatively, the server 10 transmits the bill for the calculated print charge to the image registrant 2, and after confirming the reception of the print charge, the server transmits image data of the digital image received the order to the image printer 5, and makes it form the digital print. The input of the reception of the print charge is carried out by the provider's account server which receives the payment, for example, from the PC 21 of the image registrant 2 by means of electronic money or the like, or by a computer of the proxy charge collector such as a bank, a convenience store, or the like.

Those described above are the fundamental procedure according to the first embodiment.

Figure 7:
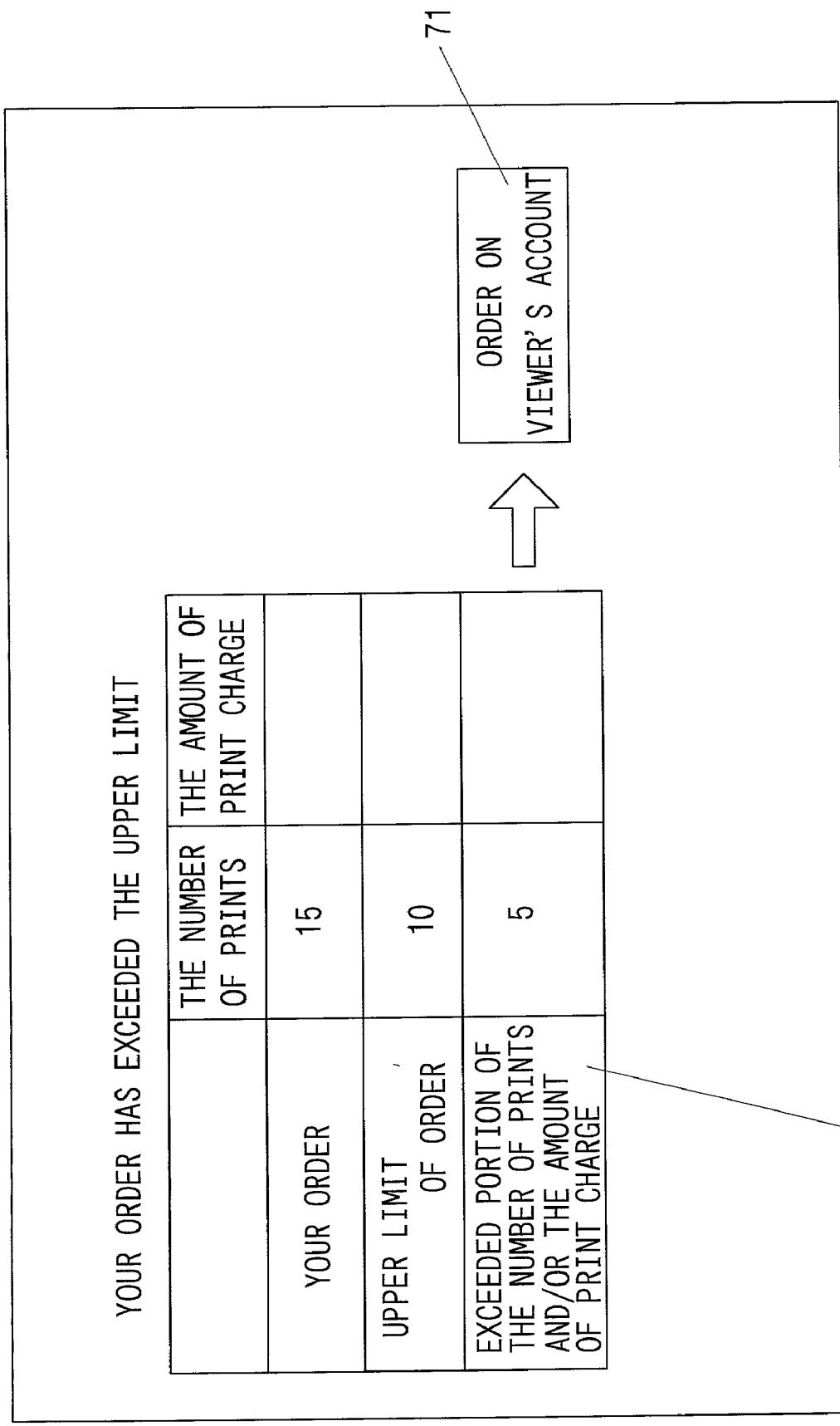
FIG. 7 is an input window for ordering a digital print charging on a viewer's account when the order exceeds the limit.

Incidentally, the display that the print order charged on the registrant's account is not accepted in step S60 is preferably change to another display that encourage the viewer to change the contents of the order in order to be accepted as an order charged on the registrant's account such as to reduce the number of print. Moreover, it is preferable to display that the exceeding portion of the order can be ordered on condition that the print charge is charged on the viewer's account. This example is shown in FIG. 7. In FIG. 7, when the button "order on a viewer's account" 71 is clicked by the mouse, the exceeding portion of the number of print and amount of charge denoted by 72 are ordered as an order charged on the viewer's account that is the conventional method.

Figure 8:
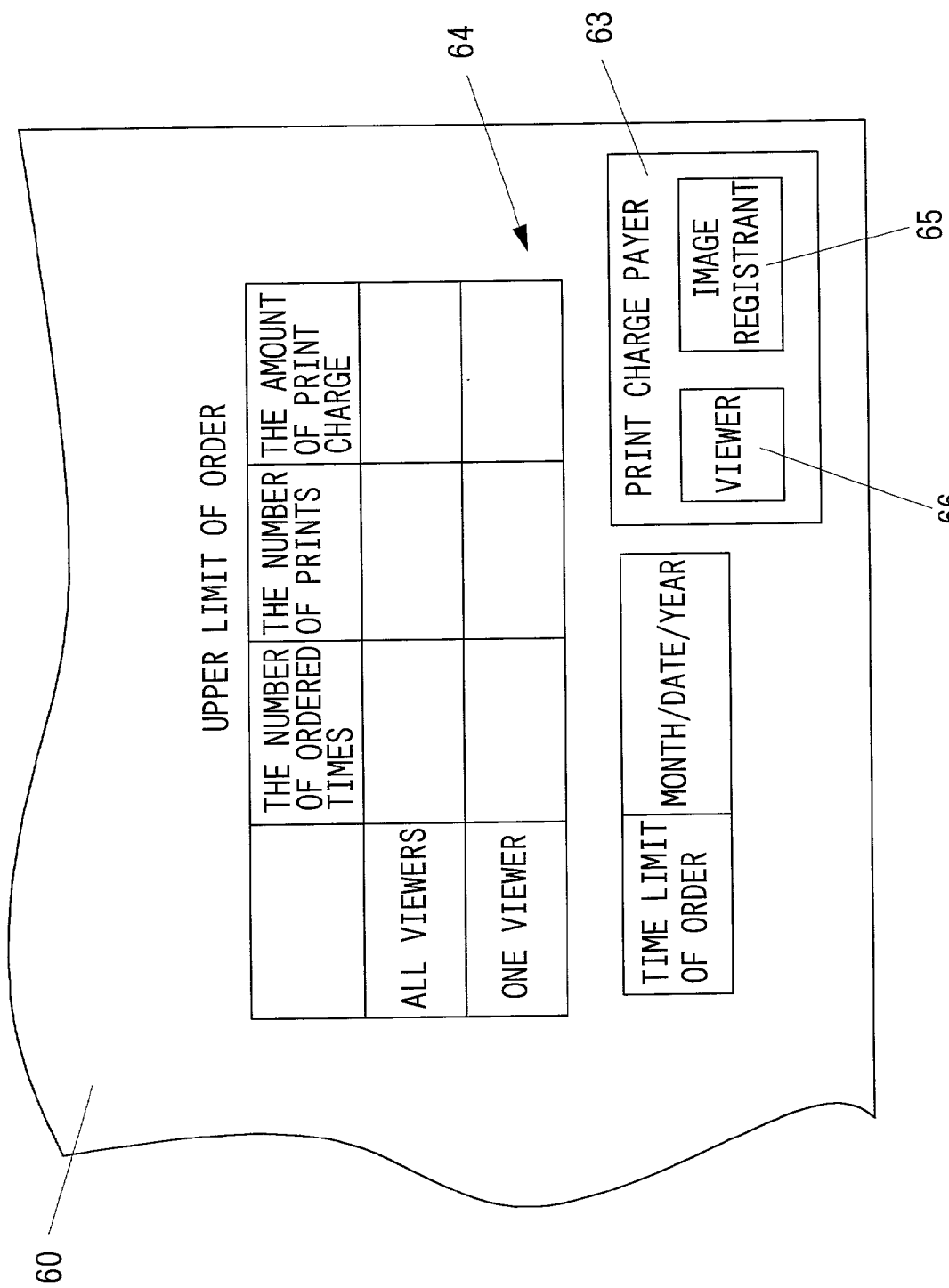
FIG. 8 is an input window showing a transmitting button of FIG. 6 substituted by a button charging on a registrant's account and a button charging on a viewer's account.

Furthermore, in the image viewing window 60 in step S50, instead of the transmission button 63, two kinds of buttons, the charge-on-registrant's-account button and the charge-on-viewer's-account button shown in FIG. 8, may be displayed in order that even the digital image charged on the registrant's account can dare to be ordered as an order charged on the viewer's account. In this case, step S55 for discriminating whether the charge of the order is charged on the registrant's account or on the viewer's account, and step S60A for receiving the order as an order charging on the viewer's account are added after step S50 (shown in FIG. 9). When the charge of the order is on the registrant's account, the flow proceeds to step S60, and when the charge of the order is on the viewer's account, the flow proceeds to step S60A. Step S70 is changed to a step that the server 10 bills to the print charge payer (the registrant or the viewer) designated based on the aforementioned discrimination.

Then, before step S80, it is inserted as step S75 that the server 10 calculates the total number of print of each digital image as a total print processing data which is the addition of the number of print order charged on the registrant's account and that on the viewer's account. In step S80, the server 10 transmits the total print processing data to the image printer 5, and makes it produce the total number of digital print in a lump. Since the print order charged on the registrant's account and that on the viewer's account can be processed in a lump, the digital print can be produced effectively.

Figure 9:
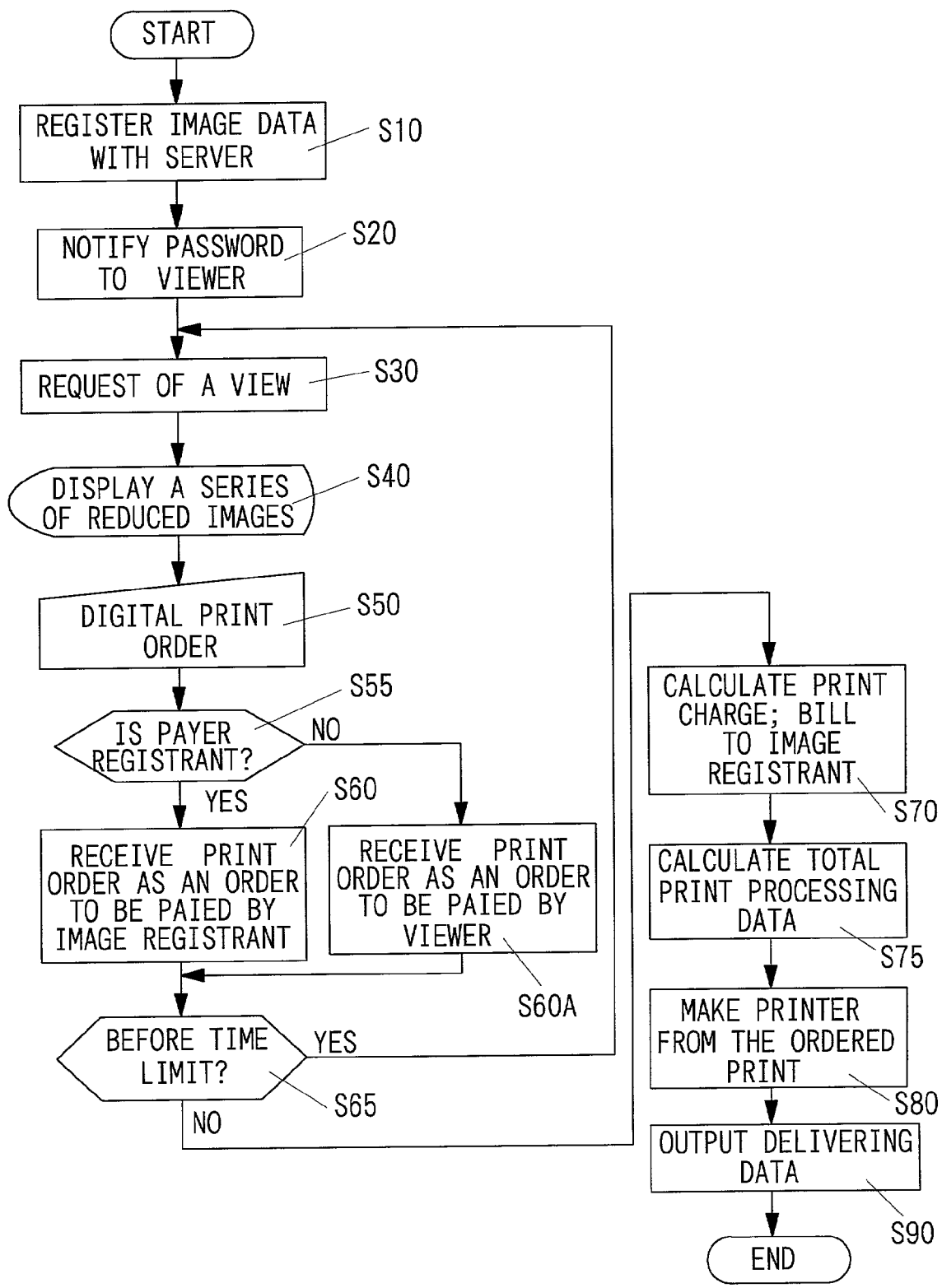
FIG. 9 is a flow chart showing a method modified from the method of FIG. 2.

Furthermore, when the time limit to accept order charged on the registrant's account has come, the order charged on the registrant's account accepted before the time limit can be processed in a lump according to step S70. Specifically, before step S70, step S65 for discriminating whether the time limit for accepting an order charged on the registrant's account has come or not is inserted (as shown in FIG. 9). When the time limit has not come yet, the flow goes back to step S30, and step for accepting the print order is repeated. When the time limit has come, the flow proceeds to step S70.

In this case, the processing to obtain the total number of print in step S75 is the processing to form the total print processing data by adding the number of print order charged on the registrant's account accepted before the time limit and that on the viewer's account with each digital image. when the order-on-viewer's-account button is not arranged as the transmission button 63, the total print processing data is formed only from the number of print order charged on the registrant's account.

Accordingly, since the production of the digital print ordered from a plurality of viewers can be processed in a lump, the digital print can be produced effectively.

The time limit for accepting an order charged on the registrant's account in step S10 is set to a limit coming periodically in a predetermined period such as the end of each month.

In the digital image that the image registrant 2 registers to the server 10, there may be included the image whose print charge is paid by the registrant and the image whose print charge is not paid by the registrant as well, that is, paid only by the viewer. In order to cope with this case, an embodiment that in the above-described first embodiment, the processing to register the digital image and the processing to view the digital image and to make order the digital print are partially modified is explained below.

Various information can be added to a digital image taken by a digital camera. The information can be added by a PC 21 on which the image is input, or by a kind of digital camera.

Figure 3:
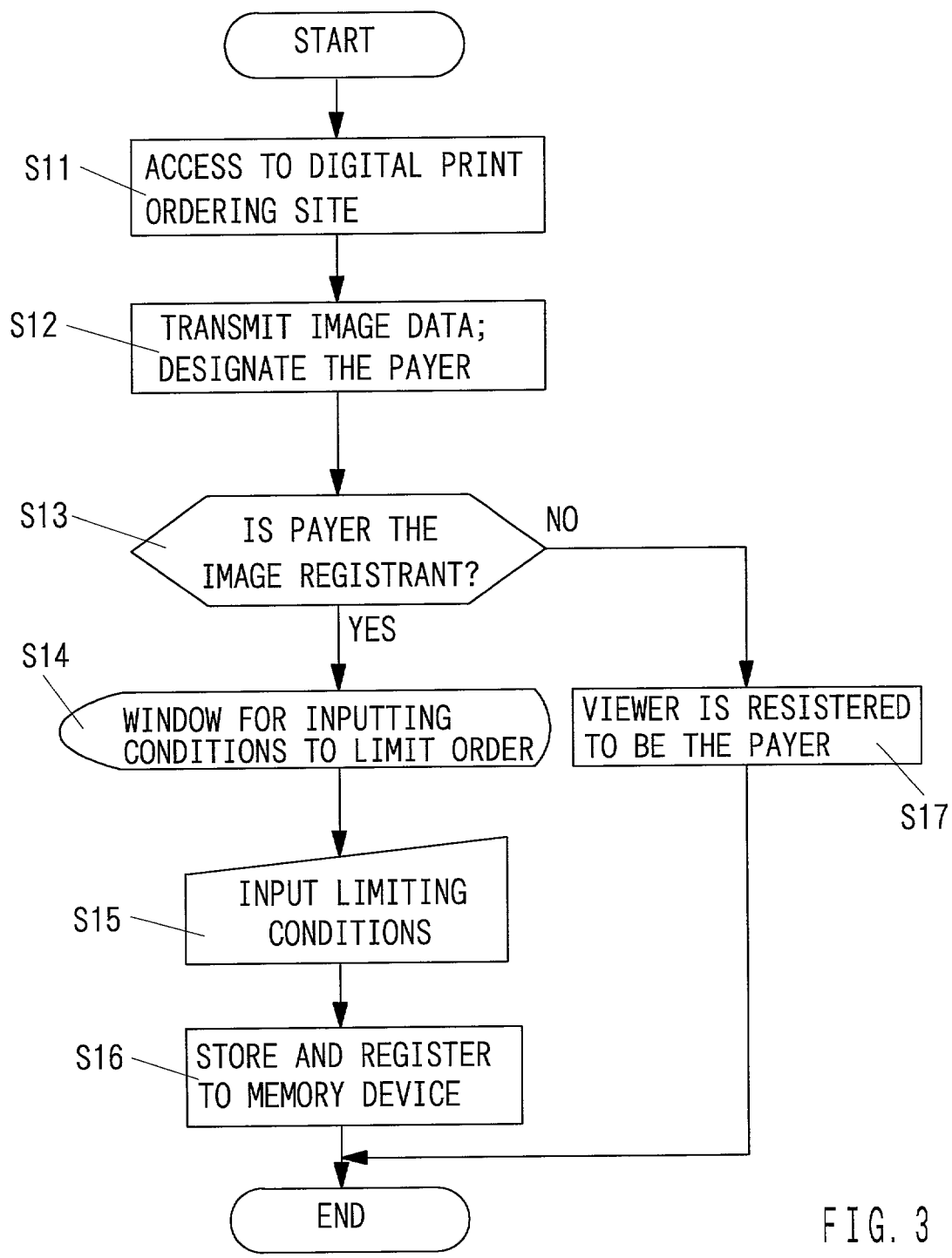
FIG. 3 is a flow chart showing a detail of step 10 in FIG. 2.
Figure 10:
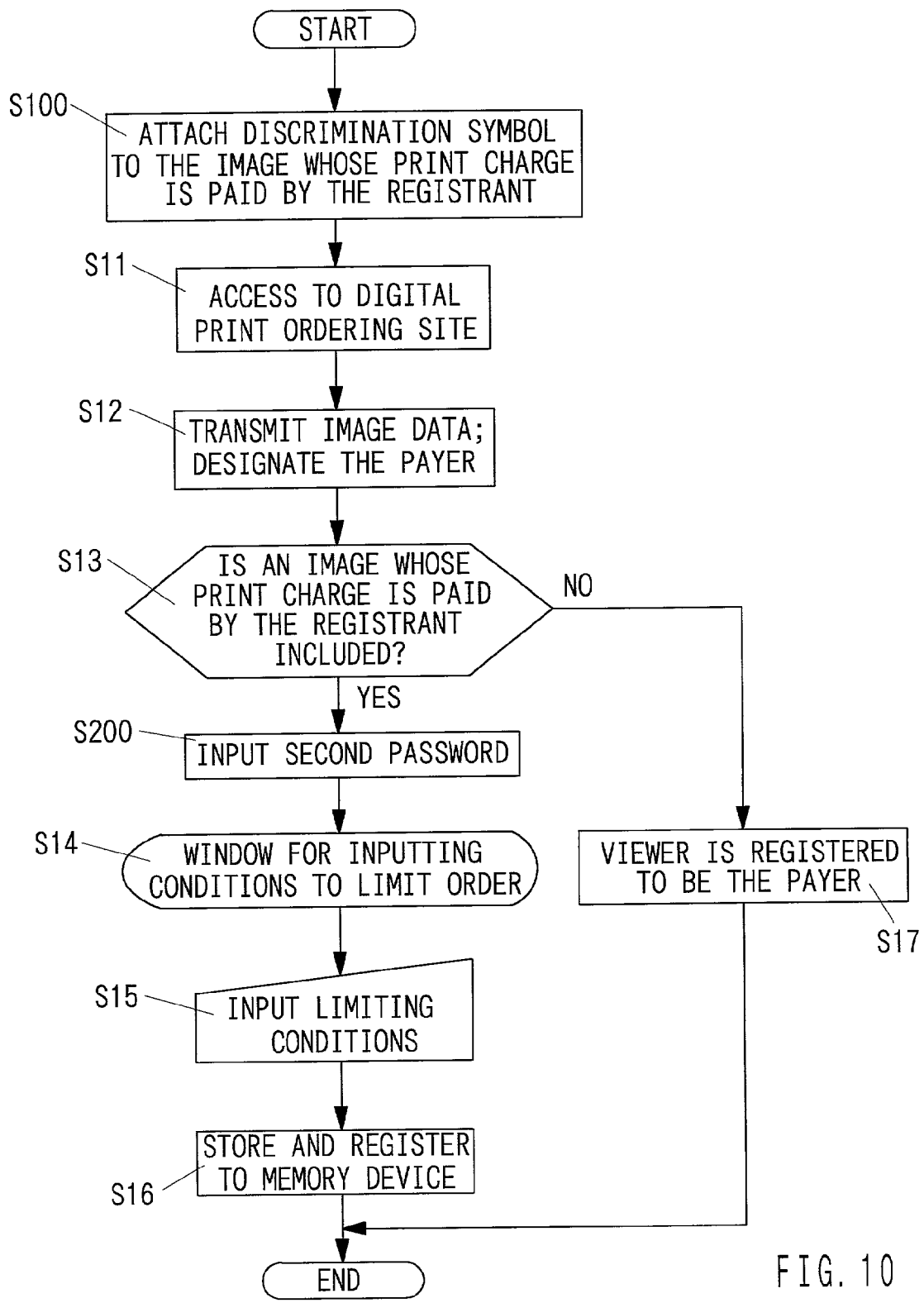
FIG. 10 is a flow chart modified a portion of processing of the flow chart shown in FIG. 3.

First, a portion of processing in FIG. 3 is modified and the flow chart becomes that shown in FIG. 10. That is, step S1100 that the image registrant 2 attaches a predetermined information as a discrimination symbol such as a flag and the like to the image whose print charge is paid by the registrant is added before step S11 in FIG. 3. In step S11, the image registrant 2 accesses to the digital print ordering site. In step S12, the digital image attached with the discrimination symbol, whose print charge is paid by the registrant, and the digital image without the discrimination symbol, whose print charge is paid by the viewer, are transmitted together to the server 10.

In step S13, the server 10 discriminates whether the image attached with the discrimination symbol is included or not. When the image attached with the discrimination symbol is included, the flow proceeds to step S200. In step S200, a window for inputting a second password is displayed and the second password is input. Then, the following steps S14 through S16 are carried out. In step S16, the second password is registered in connection with other contents to be registered.

In step S13, when it is discriminated that the image attached with the discrimination symbol is not included, the flow proceeds to step S117.

Second, in step S30 in FIG. 2, the second password is further input. In step S40, when the second password is input in step S30, all registered images are displayed regardless of existence of the discrimination symbol. On the other hand, when the second password is not input in step S30, only the images without the discrimination symbol are displayed. Viewer who does not input the second password cannot view the images whose print charge is paid by the registrant, so that they cannot order the digital print.

Alternatively, in step S30 or S60 in FIG. 2, the second password is input. In step S60, the print order of the images whose print charge is paid by the registrant is accepted only when the second password is input in step S30 or S50.

Second Embodiment

The second embodiment is a method for receiving an order for a digital print removed the processing regarding password from all steps of the first embodiment. As a result, every viewer who accesses an image-viewing-request window of a digital print order site produced by the provider 1 can view the registered digital image. The viewer can select any digital image from the digital images registered in the memory device 12, and obtain the print of the digital image charged on the registrant's account.

One application form of the second embodiment is such that, for example, the image registrant is a tour agent, the viewer is the tour participant, and the registered digital image is a digital image photographed a tourist during tour. The tour agent can provide to the tour participants, who are customers, a print of any pictures, which the tourist wants to obtain, from the pictures of the tour participants photographed during the tour.

By setting the print order limiting condition such as the maximum number of print, the time limit of order, the upper limit of the charge can be set.

Another application form is such that the image registrant is a travel agent in a tourist resort, the viewer is a provisional tourist, and the registered digital image is a digital image photographed a tourist attraction or a scenic view of the tourist resort. The travel agent can effectively advertise the tourist resort to the provisional tourist.

Moreover, another application form is such that the image registrant is a sales agent and particularly a sales agent for high-quality goods, the viewer is a provisional purchaser, and the registered digital image is a digital image photographed goods. The sales agent can effectively advertise goods. It is quite suitable for goods having delicate coloring or ultra fine structure such as dyed goods and jewelry.

In the second embodiment, the time limit for accepting an order charged on the registrant's account in step S10 is set to a time limit coming periodically in a predetermined period such as the end of each month.

Moreover, processing for storing information regarding a viewer into the memory device 12 when the server 10 receives a print order is added to step S60, and in a suitable position after step S60, for example after step S70, a step that the server 10 informs the image registrant 2 of the information with a predetermined period. The image registrant 2 can easily obtain information about the viewer who has an interest in the registered digital image.

In the method for receiving an order for digital print according to the present invention, since the viewer designates the image to be made a digital print, and the charge for the digital print bills to the image registrant, the viewer can obtain the digital print of the digital image, which the viewer wants to obtain, without any cost.

By applying the above-described method for receiving an order for digital print whose print charge is paid by the image registrant, it becomes possible to provide a high-quality label and jacket of a recording medium to the digital contents purchaser. In this case the registrant of the image sells the digital contents. The system for the purpose will be explained below.

Third Embodiment

Figure 11:
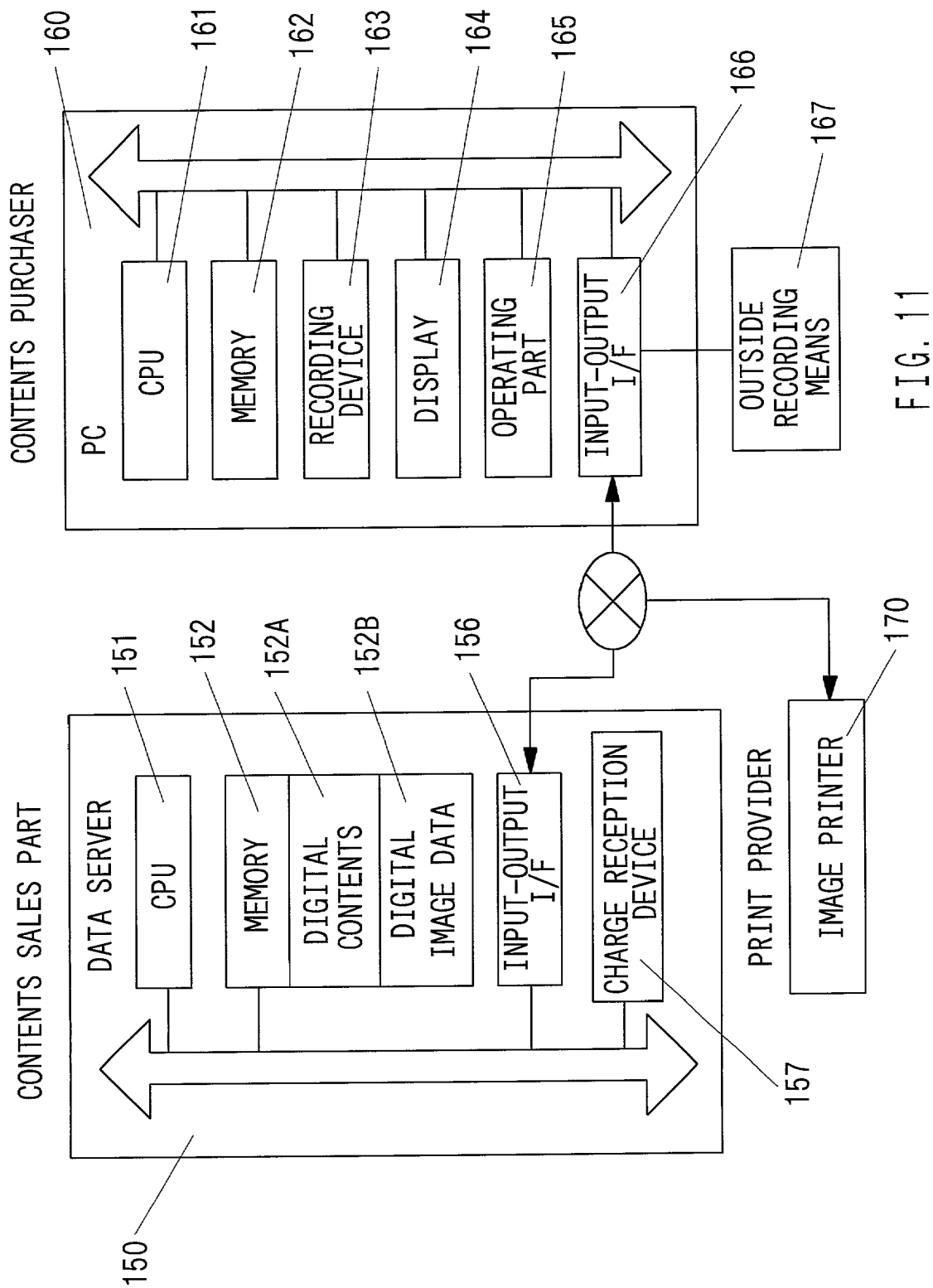
FIG. 11 is a block diagram showing a system for selling digital contents according to a third embodiment of the present invention.

A digital-contents-sales-system construction according to a third embodiment is shown in FIG. 11. The system consists of a data server 150 of a contents sales part, a PC 160 of a contents purchaser, and an image printer 170 of a print provider. The data server 150, the PC 160 and the image printer 170 are connected by means of the Internet, and are able to give/receive information with each other.

The data server 150 includes a CPU 151, a memory 152, and an input-output interface (I/F) 156, and connected with each other by a bus-line. The memory 152 is a hard disk and stores a lot of digital contents 152A to be sold such as data for music, data for computer game soft, data for digital audio visual (AV), and the like. Moreover, A lot of digital image data 152B are stored in the memory 152 in connection with a field and title name of the digital contents by a registrant. The registrant sells the digital contents. With regard to one title, at least one digital image in connection with the contents of the title is stored. The CPU 151 controls other components and makes them carry out movements described below.

The PC 160 is an average personal computer (PC) equipped with a CPU 161, a memory 162, a recording device 163, a display 164, an operating part 165 such as a keyboard, a mouse, and the like, and an input-output I/F 166. The recording device 163 includes the following various kinds of recording means corresponding with various kinds of recording media: a built-in recording means such as floppy disk drive, and the like; and various recording means 167 connected outside by the input-output I/F 166 such as a DVD-R, a CD-R, a compact flush memory, a smart media memory, a magneto-optical disk, and an MD.

The image printer 70 consists of an input-output I/F for connected with the Internet, a memory means for memorizing data input from the input-output I/F, and a print means for forming an image print based on the image data of the digital image memorized in the memory means. The print means includes an ink-jet type printer, a thermal sublimation type printer, a laser printer, and a printer for exposing and forming an image on a printing paper.

Figure 12B:
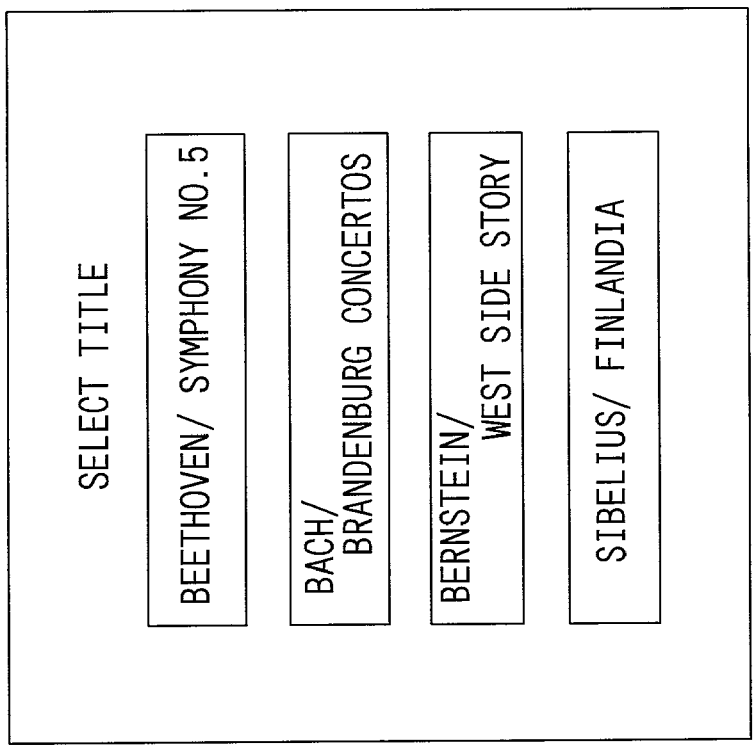
FIGS. 12A and 12B show widows for selecting a field of the contents and the title of the contents, respectively.

The contents purchaser records digital contents 152A stored in the memory means 152 of the data server 150 onto the recording medium set in the recording device 163 of the PC 160 by following the procedure described below and purchases. The contents purchaser accesses to the digital contents sales site opened on the data server 150 from the contents purchaser's PC 160 via the Internet. Then, a field of contents (such as music, game, or image) is selected from the field of contents selection window (FIG. 12A) shown on the display 164, and, then, the title of the desired contents is selected in the title selection window (FIG. 12B). These selecting operation is carried out by clicking display of the title or field of the contents by means of the mouse. By the way, several steps of selection windows can be set between FIGS. 12A and 12B.

Then, the contents purchaser carries out the process for paying the contents charge following the instruction shown on the display 164 by the data server 150. The payment is carried out, for example, by transmitting credit card information to the data server 150, or by electronic money.

The data server 150 permits to download the contents data of the selected title after confirming the payment of the charge. The contents purchaser selects the recording means to record the contents data from the PC 160, and notifies the kind of recording medium used for recording to the data server 150 via the PC 160. Then, the data of the selected contents are downloaded from the data server 150 onto the recording medium set in the selected recording means. Accordingly, the digital contents are sold from the contents sales part to the contents purchaser.

When the download of the contents have been completed or while carrying out the download, the data server 150 makes the display 164 of the PC 160 show at least one digital image in connection with the selected contents from the digital image data 152B stored in the memory means 152, and makes the contents purchaser select one of the shown images. Then, the data server 150 transmits the image data of the selected digital image and the kind of recording medium, which is notified, to the image printer 170 of the print provider via the Internet.

The image printer 170 memorizes the image of the transmitted image data and the kind of recording medium on the memory means, and prints the image of the memorized image data onto the selected paper in accordance with the memorized kind of recording medium with the shape and size in accordance with the memorized kind of recording medium. The selected paper in accordance with the memorized kind of recording medium means a label sticking on the recording medium or on the container of the recording medium, or a paper for easily producing the jacket suitable for the container. For example, it may be a paper which an adhesive is applied on the back and a protection sheet is covered, or a paper on which stitch line is formed according to the predetermined shape and size. The shape and size in accordance with the memorized kind of recording medium mean the shape and size of the label that are stuck on the container or on the recording medium, and those of the jacket that is suitable for the container. Accordingly, the label or jacket suitable for the recording medium on which the data of the contents is recorded is produced. In the specification, hereinafter the label and the jacket is called generically as the label.

After the process for paying the contents charge, the data server 150 shows the selection window for selecting the way to receive the completed label on the PC 160. The contents purchaser inputs the way to receive the completed label and the necessary information for the way to receive. For example, a home delivery service is selected as the way to receive, and the delivering address is input. Alternatively, a service counter is selected as the way to receive, and the counter where the label is to be received is input. The reception information input to the PC 160 is transmitted to the data server 150, and further transmitted to the image printer 170 together with the image data of the selected digital image.

The image printer 170 is equipped with a printer (not shown). When the reception information is the home delivery service, the image printer 170 outputs the home delivery slip to the contents purchaser's PC 160. When the reception information is the reception on a service counter, the image printer 170 outputs the exchange order to the contents purchaser's PC 160 and, at the same time, outputs the delivery slip to the selected service counter where the label is to be received. The process to hand over the completed label is carried out by using the output slip.

Thus, the contents purchaser can obtain the label that is adapted for the recording medium on which the purchased contents are recorded and that the image suitable for the contents is printed on.

Although the size of the label varies in accordance with the kind of the recording medium, the predetermined size of the paper on which the image is printed is, for example, A4 or A3. Accordingly, a blank will exist the outside of the label. The contents sales part may transmit the predetermined digital image or comment stored in the memory means 152 in advance such as an advertisement to the image printer 170, and print it on the blank. The information such as the advertisement may be a content regarding the print provider or the contents sales part, or an advertisement from a third party. In the latter case, an advertising fee can be obtained from the contents sales part or the third party.

When the contents to be on sale are digital AV, the digital image in accordance with the contents may be an image of one scene of the digital AV, and the image printer 170 may produce a high quality card or poster printed from the image with silver halide photographic quality.

It may possible that the digital image data 152B is stored in the memory means of the image printer 170, and the data server 150 receives the data of the selected image. As a result, a large quantity of image data need not to be transmitted. Moreover, the image printer 170 may consist of an input I/F for receiving data from the data server 150, a printer for forming a print of an image recorded on a photographic film, and a photographic film on which the images that the contents purchaser can select are recorded, so that the image printer 170 can form the print corresponding with the selected image data received from the data server 150.

Furthermore, the contents sales part may be the print provider.

Fourth Embodiment

FIG. 13 shows construction of digital contents sales system according to a fourth embodiment of the present invention. A contents sales apparatus 110 is set in front of a store, and sells digital contents to a contents purchaser. The contents sales apparatus 110 is equipped with a CPU 111, a memory means 112, a recording device 113, a display 114, an operating part 115, an input-output interface (I/F) 116, and the like, and connected with each other by a bus-line. The memory means 112 is a hard disk which memorizes a lot of digital contents to be on sale such as data for music, data for computer game soft, data for digital audio visual (AV), and the like. The contents sales apparatus 110 is equipped with plural kinds of recording means 131 through 137 as a recording device 113 corresponding to various kind of recording media listed as the recording device 163 in the third embodiment, and records the digital data on the recording medium set in the selected recording device by using one recording device selected from those recording devices. The display 114 equipping with a touch panel is used as an input selection device cooperating with the display 114. The CPU 111 controls movement of the above-described components, and makes them carry out movements described below.

The contents sales apparatus 110 is equipped with a charge reception device 117. The information of the charge reception is transmitted to the CPU 111. An image printer 119 is connected with the input-output I/F 116. The image printer is a digital image printer and may be in a body with the contents sales apparatus 110 or may be separated with it.

Figure 12A:
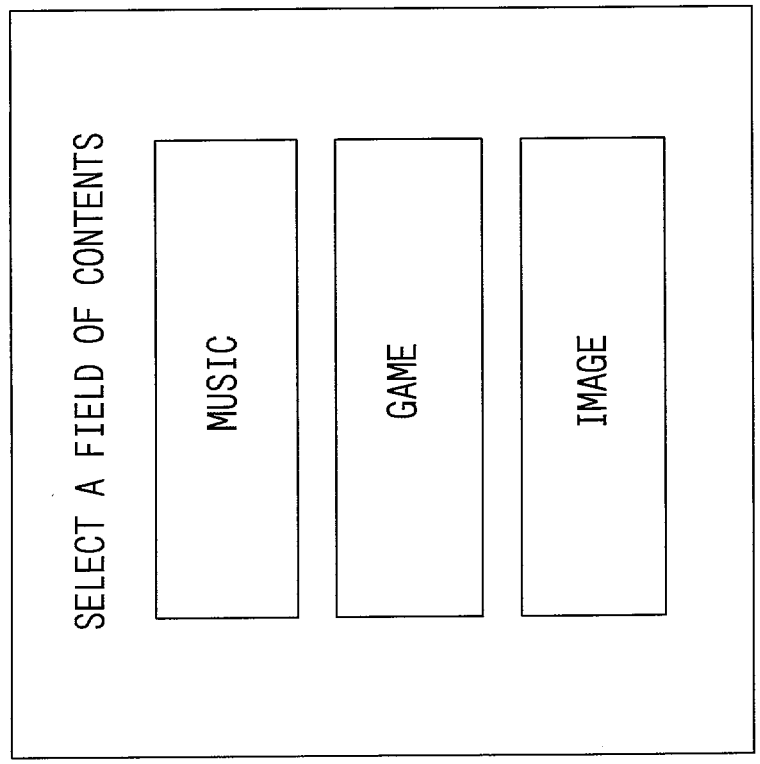
Figure 14:
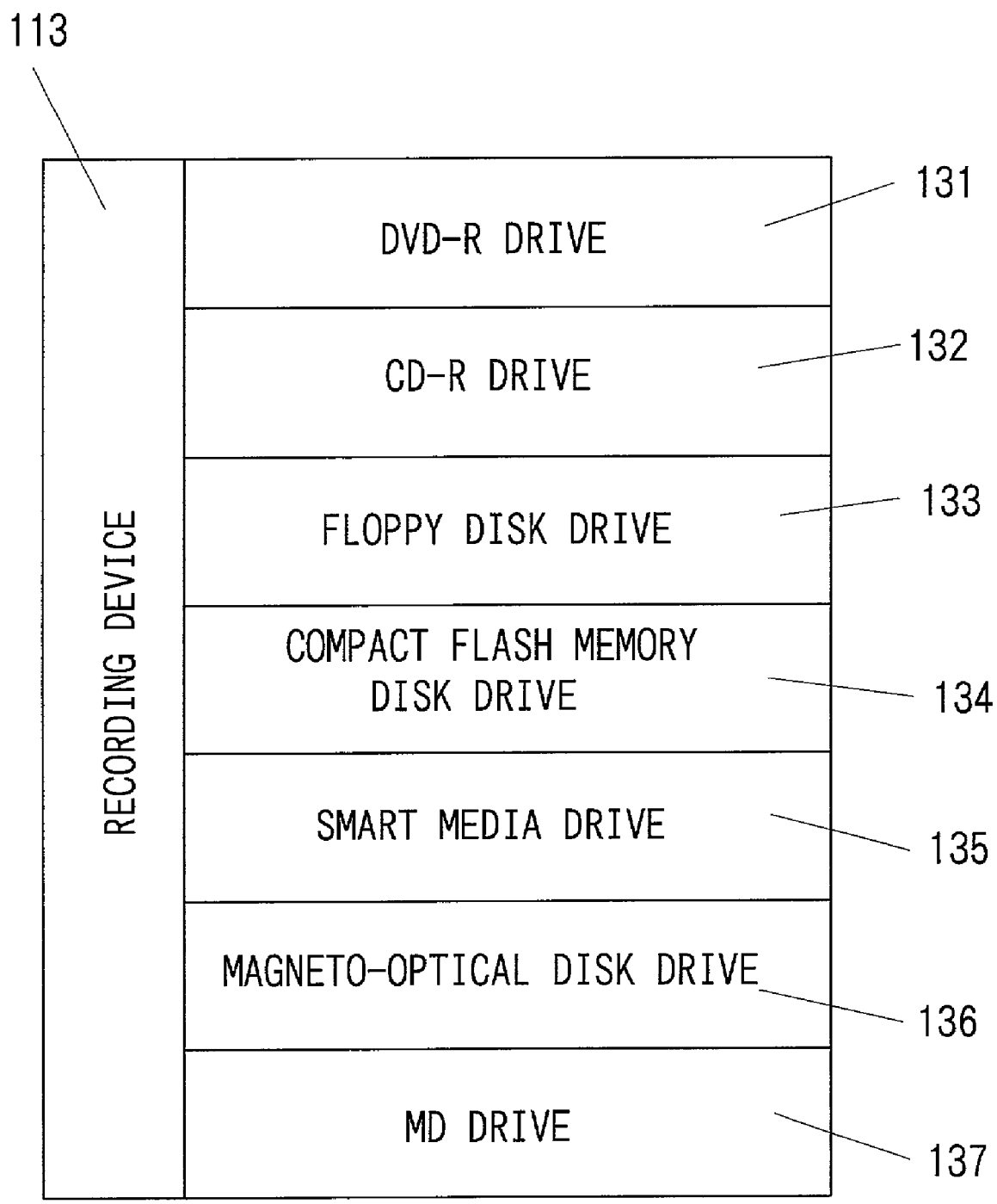
FIG. 14 is a block diagram showing a detailed construction of the recording device.
Figure 15:
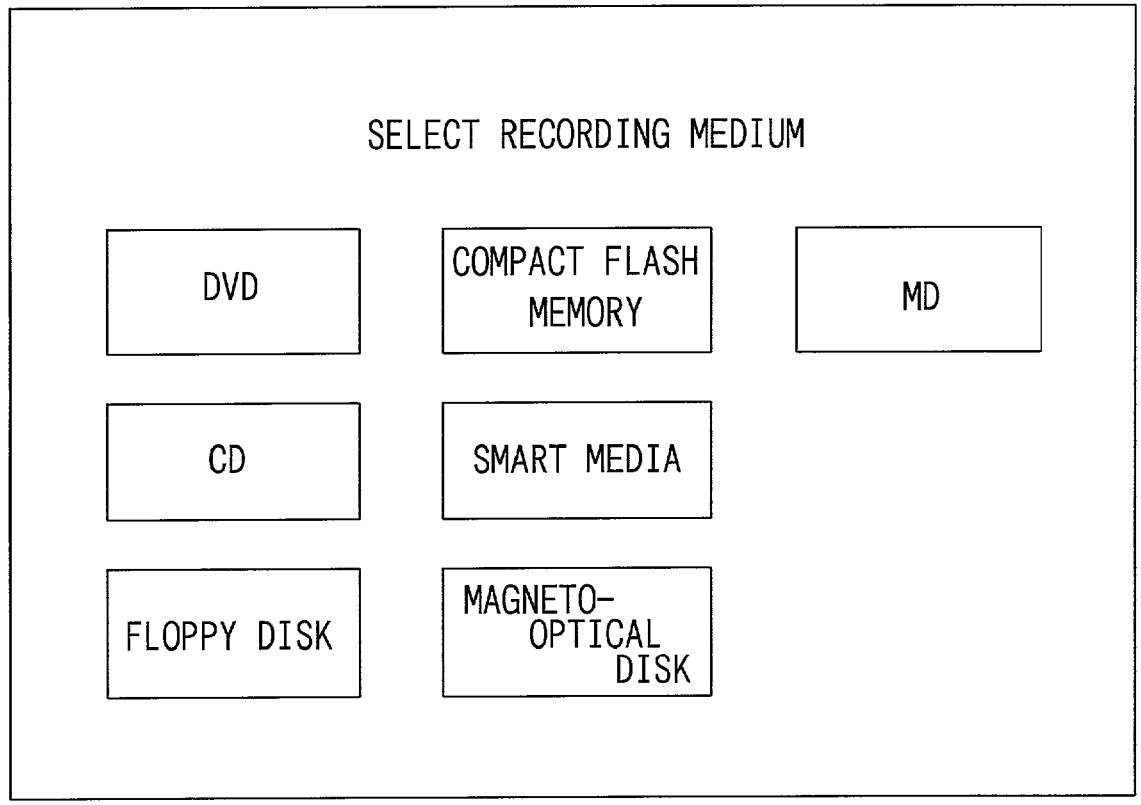
FIG. 15 shows a window for selecting a recording medium.

The contents purchaser makes the contents sales apparatus 110 show the field and title of the contents to be on sale on the display 114, and selects the desired contents by operating the operating part 115. The windows for selecting the field and title of the contents are those such as shown in FIGS. 12A and 12B in the third embodiment. The kind of the recording medium on which the data of the contents is recorded is selected on the window for selecting recording medium shown in FIG. 15, and the recording medium of the kind is set to the corresponding recording means in the recording device 113. In the selection in FIGS. 14 and 15, the touch panel is used.

The selection of the recording medium can be abbreviated by equipping the function that, in each recording device 131 through 137, whether the recording medium is set in the recording device or not is detected, and transmits the information to the CPU 111.

The CPU 111 shows the charge for the selected contents to the display 114, after confirming the payment by the charge reception device 117, picks out the selected contents from the various contents memorized in the memory means, and records to the recording medium set in the recording device 113. Thus, the digital contents are sold to the contents purchaser.

In the memory means 112, a lot of digital images are memorized in connection with the field and title of the contents by a registrant. The registrant sells a digital contents. With regard to one title, at least one digital image in connection with the contents of the title is memorized.

When the recording of the contents data to the recording medium has been completed, or during the recording, the CPU 111 makes the display 114 show at least one digital image in connection with the title of the selected contents, and makes the contents purchaser select one image among them. Then, the CPU 111 outputs the image data of the selected digital image and the kind of the recording medium on which the contents data is recorded to the image printer 119 via the input-output I/F. The image printer 119 forms the label and outputs it to the label exit as same as the first embodiment.

Since the amount of the data of the digital contents to be on sale and the image data of the digital image in connection with that is enormous, all those data or a portion of the data can be memorized in the outside data server (not shown) connected with the contents sales apparatus 110 via a communication means such as the Internet, and can be read out to the contents sales apparatus 110 from the data server on responding to the title selection of the contents purchaser.

Fifth Embodiment

Figure 16:
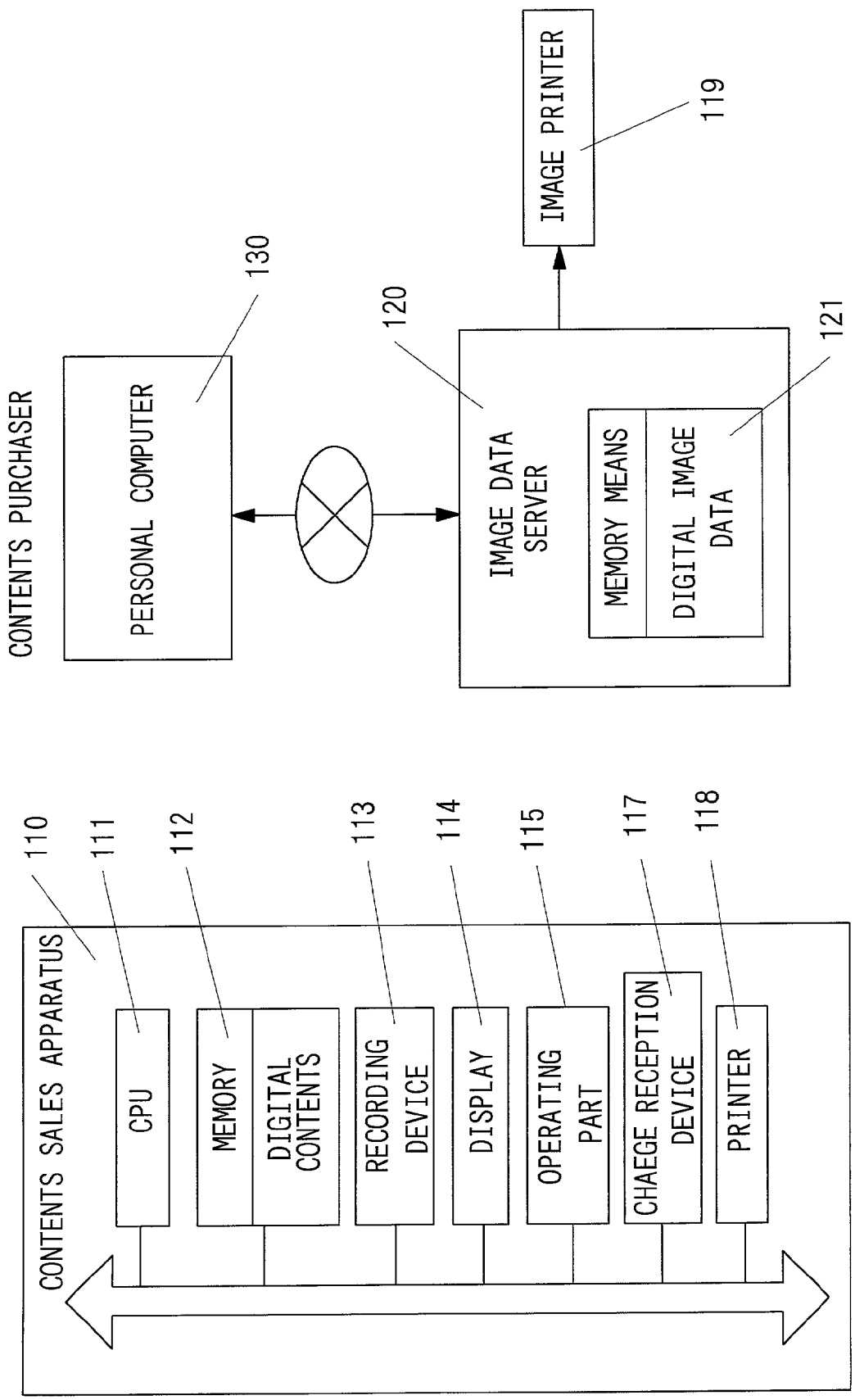
FIG. 16 is a block diagram showing a system for selling digital contents according to a fifth embodiment of the present invention.

FIG. 16 shows construction of digital contents sales system according to a fifth embodiment of the present invention. The construction in FIG. 16 is the construction that a printer 118 is added to the contents sales apparatus 110 according to the fourth embodiment. The input-output I/F can be abbreviated. The memory means 112 memorizes only the data of the digital contents. The image data of the digital image in connection with the digital contents is memorized in the memory means 121 of the image data server 120 as an image database. The image printer 119 is connected with the image data server, and not with the contents sales apparatus 110.

The contents purchaser records the contents data to the recording medium in the same way as the fourth embodiment. In this embodiment, when the recording of the contents data to the recording medium has been completed or during the recording, the CPU 111 makes the printer 118 print out the password for permitting the access to the image database and the symbol showing the field and title of the contents of the selected and recorded on the recording medium, and makes the contents purchaser bring it back. The CPU 111 may only show the password and the symbol showing the field and title of the contents on the display 114 without using the printer 118, and may make the contents purchaser record it. The password may be transmitted to the image data server via a communication means.

Later, the contents purchaser connects to the image data server 120 from the home PC 130 via the Internet, and obtains the permission to access the image database by inputting the password. Then, the symbol showing the field and title of the contents is input and transmitted to the image data server 120. The image data server 120 compares the input password with the password granted from the contents sales apparatus, and when the passwords coincide with each other, at least one digital image in connection with the contents according to the symbol is shown on the display of the PC 130, and makes the contents purchaser select one from them.

Then, the image data server 120 makes the PC 130 show the window for selecting the way to receive the completed label, makes the contents purchaser select it, and makes the contents purchaser input the necessary information for the way to receive. When the home delivery service is selected, the image data server 120 outputs the home delivery slip to the contents purchaser's PC 130. When the reception on a service counter is selected, the image data server 120 outputs the exchange order to the contents purchaser's PC 130 and, at the same time, outputs the delivery slip to the selected service counter where the label is to be received. The label is formed by using the selected digital image in the same way as the fourth embodiment.

The founder of the image data server 120 and the image printer 190 may be either the contents sales part or the print provider. When the founder is the print provider, the image data server 120 forms the bill for forming the label and for delivering it to the contents purchaser, and charges the contents sales part.

The contents purchaser can easily obtain the label and jacket suitable for the contents. The contents sales part can leave the formation of the label and jacket and the delivery to the print provider.

The forgoing description of the embodiments of the invention has been presented for purpose of illustration and description. It is not intended to be exhaustive or to limit the invention to the precise form disclosed. Obvious modifications or variations are possible in light of the above teachings. The embodiments were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A method for providing a print of a digital image registered by a registrant in response to an order from a viewer comprising:
    a first step of receiving the digital image from the registrant;
    a second step of registering the received digital image;
    a third step of showing the registered digital image to the viewer;
    a fourth step of accepting the order for the print of the digital image from the viewer;
    a fifth step of producing the ordered print of the digital image; and
    a sixth step of billing the print charge to the registrant even when the viewer which placed the order in the fourth step is a different entity than the registrant.

2. The method according to claim 1, wherein:
    the first step includes a step of receiving a digital image having a discrimination denoting that the print charge of the digital image is to be paid by the registrant;
    the second step includes a step of recording the digital image having the discrimination together with the discrimination; and
    the sixth step includes a step of billing the print charge of the print of the digital image having the discrimination to the registrant.

3. The method according to claim 2, wherein the third step includes a step of permitting only a viewer with a predetermined identification to view the image having the discrimination.

4. The method according to claim 2, wherein the fourth step includes a step of allowing only a viewer with a predetermined identification to order the print of the digital image having the discrimination.

5. The method according to claim 1, wherein the first step is carried out through a computer communication with the registrant.

6. The method according to claim 1, wherein the third and the fourth steps are carried out through a computer communication with the viewer.

7. The method according to claim 1, further comprising a step of setting a limit to the order from the viewer, wherein the fourth step includes a step of accepting the order leading to the sixth step only when the order is within the limit.

8. The method according to claim 7, wherein the limit is a sum of print charge.

9. The method according to claim 7, wherein the limit is the number of times of the orders.

10. The method according to claim 7, wherein the limit is the number of ordered prints.

11. The method according to claim 7, further comprising a step of billing the print charge exceeding the limit to the viewer.

12. The method according to claim 1, further comprising a step of making it possible to accept a print order whose print charge is paid by the viewer and a step of billing the print charge to the viewer.

13. The method according to claim 12, further comprising a step of adding the number of prints of a digital image on the viewer's account to the number of the same digital image on the registrant's account, wherein the fifth step produces the sum of the number of the prints of such a digital image.

14. The method according to claim 1, further comprising a step of setting a time limit to the fourth step, whereby the fourth step accepts the order leading to the sixth step only when the order is made within the time limit.

15. The method according to claim 1, wherein a plurality of orders are acceptable for a period, and wherein the fifth step produces the prints by summing up the orders within the period with respect to each digital image.

16. The method according to claim 1, further comprising a step of accepting an order for purchasing a product of digital contents relating to the digital image and a step of selling the product by copying the digital contents on a recording medium of the viewer.

17. A method of providing prints of a digital image registered by a registrant in response to print orders from a plurality of different viewers comprising:
    a first step of receiving the digital image from the registrant;
    a second step of registering the received digital image;
    a third step of showing the registered digital image to the plurality of different viewers;
    a fourth step of accepting the print orders for the print of the digital image from the plurality of different viewers;

a fifth step of summing up a number of the print orders for all images from the plurality of different viewers accepted within a predetermined period of time;

a sixth step of producing the prints based on the number of the summed-up print orders; and a step of billing a print charge to the registrant based on the fifth step.

18. An apparatus for providing a print of a digital image comprising:

an image input that receives a digital image from an image registrant;

a memory that records the received digital image;

an image output that outputs the digital image in order to allow a viewer to view the recorded digital image;

a print order acceptor that accepts an order for a print of the viewed digital image from the viewer;

an image data output that outputs an image data of the ordered digital image to a printer; and a billing data output that outputs a data for billing the print charge to the registrant even when the viewer which placed the order is a different entity than the registrant.

19. A method of providing a print of an image registered by a registrant in relation to a product of digital contents to be sold by the registrant and purchased by a purchaser, comprising:

a first step of receiving information of the image in relation to a product of digital contents from the registrant through a computer communication;

a second step of producing the print of the image based on the information of the image in relation to the product of digital contents that has been purchased by a purchaser; and a third step of billing a print charge associated with the second step to the registrant, wherein the purchaser is a different entity than the registrant.

20. The method according to claim 19, wherein the information of the image is a kind of information including an image data of a digital image.

21. The method according to claim 19, wherein the information of the image includes information that specifies the image.

22. The method according to claim 21, wherein the specified image is an image recorded on a film.

23. The method according to claim 21, wherein the specified image is a digital image.

24. The method according to claim 23, further comprising a step of obtaining the image data of the specified digital image from outside.

25. The method according to claim 19, further comprising a step of receiving information regarding the kind of the recording medium on which the digital contents purchased by the product purchaser are recorded.

26. The method according to claim 25, further comprising a step of selecting a paper for the print and contents of the print other than the image based on the information regarding the kind of the recording medium, and a step of printing the contents of the print other than the image in a predetermined area of the paper.

27. The method according to claim 19, further comprising a step of receiving information to deliver the print to the purchaser.

28. A method of providing a print of an image registered by a registrant in relation to a product of digital contents to be sold by the registrant and purchased by a purchaser comprising:

a first step of accepting a contact from the purchaser having an authorization of the registrant, the authorization obtained through purchase by the purchaser of a product of digital contents from the registrant;

a second step of producing the print of the image in relation to the product of digital contents based on the authorization; and a third step of billing the print charge to the registrant, wherein the purchaser is a different entity than the registrant.

29. The method according to claim 28, wherein the authorization includes information regarding the image.

30. The method according to claim 28, wherein the authorization includes a password for request to produce the print.

31. The method according to claim 28, wherein the first step includes a step of accepting the contact from the purchaser though a personal computer of the purchaser.

32. An apparatus providing a print of an image registered by a registrant in relation to a product of digital contents to be sold by the registrant and purchased by a purchaser comprising:

an image information input that receives information of an image associated with the digital contents that has been purchased by a purchaser; and a billing data output that outputs a data for billing the print charge for printing the image to the registrant, wherein the purchaser is a different entity than the registrant.

33. A method for providing a purchaser of a product of digital contents with a print of an image registered by a registrant relating to the product of digital contents, comprising:

a first step of having the registrant sell the product of digital contents to the purchaser;

a second step of having a printer receive information relating to the registered image relating to the product of digital contents that was sold to the purchaser from the registrant;

a third step of having the printer produce the print of the image for the purchaser based on the information; and a fourth step of having the printer bill the print charge to the registrant, wherein the purchaser is a different entity than the registrant.

34. The method according to claim 33, wherein the second step is carried out through a computer communication with the registrant.

35. The method according to claim 33, further comprising a step of having the registrant issue an identification of the image to the purchaser, and a step of having the printer receive the identification from the purchaser.

36. The method according to claim 33, further comprising a step of having the registrant issue a password to the purchaser, and wherein the third step is only effective when the password is input to the printer.

* * * * *